United States Patent
Li et al.

(10) Patent No.: US 12,372,430 B2
(45) Date of Patent: Jul. 29, 2025

(54) PRESSURE SENSOR FOR AN INFLATABLE STRUCTURE

(71) Applicant: Toyota Motor Engineering & Manufacturing North America, Inc., Plano, TX (US)

(72) Inventors: Xiaopeng Li, Ann Arbor, MI (US); Taehwa Lee, Ann Arbor, MI (US); Ziqi Yu, Ann Arbor, MI (US); Yuyang Song, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 218 days.

(21) Appl. No.: 18/133,076

(22) Filed: Apr. 11, 2023

(65) Prior Publication Data
US 2024/0280426 A1     Aug. 22, 2024

Related U.S. Application Data

(60) Provisional application No. 63/447,489, filed on Feb. 22, 2023.

(51) Int. Cl.
*G01L 9/08*     (2006.01)
*G01L 9/00*     (2006.01)
(Continued)

(52) U.S. Cl.
CPC ........... *G01M 7/025* (2013.01); *G01L 9/0022* (2013.01); *G01L 9/06* (2013.01); *G01L 9/08* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 4,492,246 A    1/1985    Prescott et al.
5,499,526 A    3/1996    Muro
(Continued)

FOREIGN PATENT DOCUMENTS

WO    2013076270 A1    5/2013
WO    WO-2016081915 A1 *    5/2016    ............ E21B 47/06

OTHER PUBLICATIONS

Wu et al., "Asymmetric scattering of flexural waves in a parity-time symmetric metamaterial beam," The Journal of the Acoustical Society of America, vol. 146, 2019, pp. 850-862 (13 pages).
(Continued)

*Primary Examiner* — Andre J Allen
(74) *Attorney, Agent, or Firm* — Christopher G. Darrow; Darrow Mustafa PC

(57) ABSTRACT

Systems described herein relate to sensing pressure. In one arrangement, a pressure sensor is disclosed. The pressure sensor includes a circuit including a resistor, an inductor, and a capacitor. The circuit generates an electrical resonance. The resistor is an elastomer having a resistance and connected to an outer surface of an inflatable. The pressure sensor also includes a resonator connected to the circuit. The resonator generates a mechanical resonance coupling with the electrical resonance to create a detuning frequency having a sublinear dependence on the resistance of the elastomer. A pressure of the inflatable correlates with the detuning frequency.

20 Claims, 3 Drawing Sheets

(51) Int. Cl.
*G01L 9/06* (2006.01)
*G01M 7/02* (2006.01)
*G01M 17/02* (2006.01)

(58) Field of Classification Search
CPC ............ G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 9/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/12; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/65; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 209/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106; B60C 23/0408; B60C 23/0496; B60C 23/061; B60C 23/0494; B60C 23/0416; B60C 23/0433; B60C 23/0493; B60C 19/00; B60C 23/04; B60C 23/0462; B60C 23/20; B60C 23/041; B60C 23/0411; B60C 23/0479; B60C 23/0444; B60C 11/246; B60C 23/064; B60C 23/0488; B60C 11/24; B60C 23/007; B60C 23/062; B60C 23/0401; B60C 23/0413; B60C 23/06; B60C 23/043; B60C 23/0452; B60C 23/0498; B60C 23/02; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/003; B60C 23/00318; B60C 23/0403; B60C 23/0406; B60C 23/0472; B60C 23/066; B60C 23/00; B60C 23/00372; B60C 29/02; B60C 23/006; B60C 11/00; B60C 23/0454; B60C 23/044; B60C 23/0455; B60C 23/008; B60C 23/0483; B60C 25/002; B60C 23/0461; B60C 23/0474; B60C 23/0489; B60C 23/0491; B60C 29/064; B60C 23/0415; B60C 23/00363; B60C 23/0459; B60C 23/0471; B60C 23/0481; B60C 23/0476; B60C 11/0318; B60C 23/0477; B60C 2200/02; B60C 23/002; B60C 23/0437; B60C 2019/005; B60C 23/042; B60C 23/0405; B60C 23/0422; B60C 23/0423; B60C 23/0466; B60C 13/001; B60C 29/06; B60C 23/0447; B60C 25/132; B60C 23/0427; B60C 23/0449; B60C 9/18; B60C 25/00; B60C 23/065; B60C 23/0484; B60C 23/0486; B60C 19/003; B60C 13/00; B60C 23/00336; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/04; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/12; B60C 2019/007; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/326; G01M 1/02; G01M 1/30; G01M 17/0074; G01M 5/0058; G01M 1/26; G01M 17/04; G01M 1/225; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 3/40; G01M 1/04; G01M 17/08; G01M 17/03; G01M 5/0091; G01M 1/365; G01M 13/04; G01M 5/0066; G01M 1/08; G01M 1/22; G01M 13/027; G01M 5/0033; G01M 1/00; G01M 15/044; G01M 17/00; G01M 3/24; G01M 3/2876; G01M 5/0075; G01M 1/06; G01M 1/12; G01M 1/122; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 1/14; G01M 1/28; G01M 3/002; G01M 3/04; G01M 7/02; G01M 9/06

USPC .................................. 73/146–146.8, 700–756

See application file for complete search history.

(56) References Cited

U.S. PATENT DOCUMENTS

| | | |
|---|---|---|
| 7,358,503 B2 | 4/2008 | Fellerman et al. |
| 7,551,058 B1 | 6/2009 | Johnson et al. |
| 9,411,029 B2 | 8/2016 | Pirkl |
| 9,933,503 B2 | 4/2018 | Vernickel et al. |
| 10,284,176 B1 | 5/2019 | Solal |
| 10,717,672 B2 | 7/2020 | Loh et al. |
| 10,724,994 B2 | 7/2020 | Van Tooren et al. |
| 11,022,561 B2 | 6/2021 | Ziehl |
| 11,162,972 B2 | 11/2021 | Abdolvand et al. |
| 2009/0301176 A1* | 12/2009 | Rowe ............... G01L 9/0052 310/314 |
| 2011/0107838 A1* | 5/2011 | Suijlen ............. G01L 9/0019 73/702 |
| 2014/0053651 A1* | 2/2014 | Besling ............ G01L 9/0042 73/702 |
| 2015/0308911 A1 | 10/2015 | Pechstedt et al. |
| 2015/0338380 A1 | 11/2015 | Ziehl et al. |
| 2017/0115382 A1 | 4/2017 | Koudar et al. |
| 2018/0107015 A1 | 4/2018 | Dümpelmann et al. |

(56) References Cited

U.S. PATENT DOCUMENTS

| | | |
|---|---|---|
| 2022/0051650 A1 | 2/2022 | Lee et al. |
| 2022/0190231 A1 | 6/2022 | Li et al. |
| 2022/0214312 A1 | 7/2022 | Lee et al. |
| 2022/0285604 A1 | 9/2022 | Li et al. |
| 2024/0371349 A1* | 11/2024 | Li .................... G10K 11/172 |
| 2024/0371350 A1* | 11/2024 | Li .................... G10K 11/04 |
| 2024/0372530 A1* | 11/2024 | Li .................... H03H 9/02015 |

OTHER PUBLICATIONS

Schipf et al., "Tunable piezoelectric metamaterial for Lamb waves using periodic shunted circuits," arXiv:2207.07845v1, Jul. 16, 2022, pp. 1-30 (30 pages).

Zhao et al., "Numerical analysis of effective refractive index ultrasonic sensor based on Cantilever arm structure slot-based dual-micro-ring resonator," International Journal of Modern Physics B, vol. 35, No. 4, 2021, pp. 1-15 (15 pages).

Durdaut et al., "Phase Sensitivity and Phase Noise of Cantilever-Type Magnetoelastic Sensors Based on the ΔE Effect," arXiv:2003.01085v1, Mar. 2, 2020, pp. 1-15 (15 pages).

Casadei et al., "Piezoelectric resonator arrays for tunable acoustic waveguides and metamaterials," Journal of Applied Physics, vol. 112, 2012, pp. 1-6 (6 pages).

Casadei et al., "Broadband vibration control through periodic arrays of resonant shunts: experimental investigation on plates," Smart Materials and Structures, vol. 19, No. 1, 2010, pp. 1-13 (13 pages).

Cardella et al., "Manipulating waves by distilling frequencies: a tunable shunt-enabled rainbow trap," Smart Materials and Structures, vol. 25, 2016, pp. 1-15 (15 pages).

Jain et al., "Emerging Ideas in Nanocantilever based Biological Sensors," arXiv:1305.5729, 2013, pp. 1-17 (17 pages).

Airoldi et al., "Design of tunable acoustic metamaterials through periodic arrays of resonant shunted piezos," New Journal of Physics, vol. 13, Nov. 2011, pp. 1-21 (22 pages).

Chen et al., "Exceptional points enhance sensing in an optical microcavity," Nature, vol. 548, 2017, pp. 192-197 (16 pages).

Su et al., "Research on damage visualization of concrete structures based on electrical resistance tomography," Frontiers in Physics, 2022, pp. 1-12 (12 pages).

Ashida et al., "Non-Hermitian Physics," Advances in Physics 69 (3) (2020), pp. 249-435 (186 pages).

Guo et al., "Observation of PT-symmetry breaking in complex optical potentials," Physical Review Letters, vol. 103, Issue 9, 2009, pp. 1-4 (4 pages).

Lee et al., "Topolectrical circuits," Communications Physics 1 (1), 2018, pp. 1-9 (9 pages).

Yoshida et al., "Exceptional rings protected by emergent symmetry for mechanical systems," Physical Review B, vol. 100, Issue 5, 2019, pp. 1-17 (17 pages).

Fleury et al., "An invisible acoustic sensor based on parity-time symmetry," Nature Communications 6 (1), 2015, pp. 1-7 (7 pages).

Zangeneh-Nejad et al., "Active times for acoustic metamaterials," Reviews in Physics, vol. 4, Nov. 2019, pp. 1-17 (17 pages).

Ding et al., "Emergence, coalescence, and topological properties of multiple exceptional points and their experimental realization," Physical Review X, vol. 6, Issue 2, 2016, pp. 1-13 (13 pages).

Gear et al., "Unidirectional zero reflection as gauged parity-time symmetry," New Journal of Physics, vol. 19, Issue 12, 2017, pp. 1-10 (10 pages).

Lin et al., "Unidirectional invisibility induced by pt-symmetric periodic structures," Physical Review Letters, vol. 106, Issue 21, 2011, pp. 1-4 (4 pages).

Li et al., "Experimental demonstration of extremely asymmetric flexural wave absorption at the exceptional point," Extreme Mechanics Letters, vol. 52, Apr. 2022, pp. 1-6 (6 pages).

Wang et al., "Extremely asymmetrical acoustic metasurface mirror at the exceptional point," Physical Review Letters, vol. 123, Issue 21, Nov. 2019, pp. 1-5 (5 pages).

Hodaei et al., "Enhanced sensitivity at higher-order exceptional points," Nature, vol. 548 (7666), Aug. 2017, pp. 187-192 (15 pages).

Assawaworrarit et al., "Robust wireless power transfer using a nonlinear parity-time-symmetric circuit," Nature, vol. 546 (7658), Jun. 2017, pp. 387-390 (13 pages).

Peng et al., "Parity-time-symmetric whispering-gallery microcavities," Nature Physics, vol. 10, Issue 5, May 2014, pp. 394-398 (5 pages).

Yi et al., "Asymmetric viscoelastic metamaterials for broad bandgap design and unidirectional zero reflection," Mechanical Systems and Signal Processing, vol. 162, Jan. 2022, pp. 1-15 (15 pages).

Wang et al., "Coherent perfect absorption at an exceptional point," Science, vol. 373, Issue 6560, Sep. 2021, pp. 1261-1265 (6 pages).

Sweeney et al., "Perfectly absorbing exceptional points and chiral absorbers," Physical review letters, vol. 122, Issue 9, Mar. 2019, pp. 1-6 (6 pages).

Zhu et al., "Simultaneous observation of a topological edge state and exceptional point in an open and non-Hermitian acoustic system," Physical review letters, vol. 121, Issue 12, Sep. 2018, pp. 1-14 (14 pages).

Liu et al., Willis metamaterial on a structured beam, Physical Review X, vol. 9, Issue 1, 2019, pp. 1-21 (21 pages).

Domínguez-Rocha et al., "Environmentally induced exceptional points in elastodynamics," Physical Review Applied 13 (1), 2020, pp. 1-8 (8 pages).

Cummer et al., "Controlling sound with acoustic metamaterials," Nature Reviews Materials, vol. 1, Issue 3, Mar. 2016, pp. 1-13 (13 pages).

Chen et al., "A review of tunable acoustic metamaterials," Applied Sciences, vol. 8, Issue 9, 2018, pp. 1-21 (21 pages).

Ji et al., "Recent progress in acoustic metamaterials and active piezoelectric acoustic metamaterials—a review," Applied Materials Today, vol. 26, Mar. 2022, pp. 1-28 (28 pages).

Popa et al., "Non-reciprocal and highly nonlinear active acoustic metamaterials," Nature Communications, vol. 5, Issue 1, 2014, pp. 1-5 (5 pages).

Popa et al., "Active acoustic metamaterials reconfigurable in real-time," Physical Review B, vol. 91, Issue 22, 2015, pp. 1-7 (7 pages).

Akl et al., "Analysis and experimental demonstration of an active acoustic metamaterial cell," Journal of Applied Physics, vol. 111, Issue 4, 2012, pp. 1-9 (9 pages).

Chen et al., "An active mechanical Willis meta-layer with asymmetric polarizabilities," Nature Communications, vol. 11, Issue 1, 2020, pp. 1-8 (8 pages).

Li et al., "Shaping elastic wave mode conversion with a piezoelectric-based programmable meta-boundary," Extreme Mechanics Letters, vol. 39, Sep. 2020, pp. 1-18 (18 pages).

Li et al., "An active meta-layer for optimal flexural wave absorption and cloaking," Mechanical Systems and Signal Processing, vol. 149, Feb. 2021, pp. 1-35 (35 pages).

Chen et al., "Realization of active metamaterials with odd micropolar elasticity," Nature Communications, vol. 12, Issue 1, 2021, pp. 1-12 (12 pages).

Li et al., "Acoustic metamaterials capable of both sound insulation and energy harvesting," Smart Materials and Structures, vol. 25, No. 4, 2016, pp. 1-5 (5 pages).

Airoldi et al., "Design of tunable acoustic metamaterials through periodic arrays of resonant shunted piezos," New Journal of Physics, vol. 13, Issue 11, Nov. 2011, pp. 1-21 (22 pages).

Thomes et al., "Space-time wave localization in electromechanical metamaterial beams with programmable defects," Mechanical Systems and Signal Processing, vol. 167, Part B, Mar. 2022, pp. 1-16 (16 pages).

Trainiti et al., "Time-periodic stiffness modulation in elastic metamaterials for selective wave filtering: theory and experiment," Physical Review Letters, vol. 122, Issue 12, Mar. 2019, pp. 1-11 (17 pages).

Chen et al., "Enhanced flexural wave sensing by adaptive gradient-index metamaterials," Scientific Reports, vol. 6, Issue 1, 2016, pp. 1-11 (11 pages).

Zhu et al., "Experimental study of an adaptive elastic metamaterial controlled by electric circuits," Applied Physics Letters, vol. 108, Issue 1, 2016, pp. 1-5 (6 pages).

(56) References Cited

OTHER PUBLICATIONS

Hu et al., "Metamaterial beam with graded local resonators for broadband vibration suppression," Mechanical Systems and Signal Processing, vol. 146, Jan. 2021, pp. 1-20 (20 pages).

Yi et al., "Programmable metamaterials with digital synthetic impedance circuits for vibration control," Smart Materials and Structures, vol. 29, No. 3, 2020, pp. 1-21 (21 pages).

Sugino et al., "Digitally programmable resonant elastic metamaterials," Physical Review Applied, vol. 13, Issue 6, 2020, pp. 1-5 (5 pages).

Wang et al., "Multi-resonant piezoelectric shunting induced by digital controllers for subwavelength elastic wave attenuation in smart metamaterial," Smart Materials and Structures, vol. 26, No. 2, 2017, pp. 1-20 (20 pages).

Li et al., "A self-adaptive metamaterial beam with digitally controlled resonators for subwavelength broadband flexural wave attenuation," Smart Materials and Structures, vol. 27, No. 4, 2018, pp. 1-13 (13 pages).

Gripp et al., "Vibration and noise control using shunted piezoelectric transducers: A review," Mechanical Systems and Signal Processing, vol. 112, Nov. 2018, pp. 359-383 (25 pages).

Chen et al., "Elastic-electro-mechanical modeling and analysis of piezoelectric metamaterial plate with a self powered synchronized charge extraction circuit for vibration energy harvesting," Mechanical Systems and Signal Processing vol. 143, Sep. 2020, pp. 1-27 (27 pages).

Nassar et al., "Nonreciprocity in acoustic and elastic materials," Nature Reviews Materials, vol. 5, Issue 9, 2020, pp. 667-685 (34 pages).

Sugino et al., "Nonreciprocal piezoelectric metamaterial framework and circuit strategies," Physical Review B 102 (1), 2020, pp. 1-7 (7 pages).

Wu et al., "Asymmetric scattering of flexural waves in a parity-time symmetric metamaterial beam," The Journal of the Acoustical Society of America, vol. 146, Iss. 1, 2019, pp. 850-862 (13 pages).

Doppler et al., "Dynamically encircling an exceptional point for asymmetric mode switching," Nature, vol. 537, 2016, pp. 1-13 (13 pages).

Zhang et al., "Dynamically encircling exceptional points: in situ control of encircling loops and the role of the starting point," Physical Review X, vol. 8, Issue 2, Apr. 2018, pp. 1-18 (18 pages).

Preumont, "Vibration control of active structures: an introduction," 3rd edition, vol. 246, Springer, 2018, pp. 1-202 (202 pages).

Tang et al., "Active-passive hybrid piezoelectric networks for vibration control: comparisons and improvement," Smart Materials and Structures, vol. 10, No. 4, 2001, pp. 794-806 (14 pages).

Neubauer et al., "Vibration damping with shunted piezoceramics: fundamentals and technical applications," Mechanical Systems and Signal Processing, vol. 36, Issue 1, 2013, pp. 36-52 (17 pages).

Haus et al., "Waves and fields in optoelectronics," Prentice-Hall, Inc., Englewood Cliffs, NJ, 1984, 402.

Fan et al., "Temporal coupled-mode theory for the fano resonance in optical resonators," JOSA A, vol. 20, Issue 3, 2003, pp. 569-572 (4 pages).

Zhang et al., "A metamaterial beam with inverse nonlinearity for broadband micro-vibration attenuation," Mechanical Systems and Signal Processing, vol. 159, Oct. 2021, pp. 1-13 (13 pages).

Allik et al., "Finite element method for piezoelectric vibration," International Journal for Numerical Methods in Engineering, vol. 2, Issue 2, 1970, pp. 151-157 (7 pages).

Leng et al., "Limits of flexural wave absorption by open lossy resonators: reflection and transmission problems," New Journal of Physics, vol. 21, May 2019, pp. 1-11 (11 pages).

Li et al., "An active meta-layer for optimal flexural wave absorption and cloaking," Mechanical Systems and Signal Processing, vol. 149, Feb. 15, 2021, pp. 1-35 (35 pages).

Hsu et al., "Bound states in the continuum," Nature Reviews Materials 1, Article No. 16048, 2016, pp. 1-44 (44 pages).

Li et al. "Observation of an exceptional point with an LR-shunted resonator," Mechanical Systems and Signal Processing, vol. 196, Aug. 1, 2023, pp. 1-25 (26 pages).

Li et al. "Experimental study of a tunable perfect flexural wave absorber with a piezoelectric shunted resonator," Frontiers in Physics, vol. 10, Dec. 13, 2022, pp. 1-7 (7 pages).

Iizuka et al., "Temporal coupled mode theory linking to surface-wave dispersion relations in near-field electromagnetic heat transfer," Journal of Applied Physics, 2016, 10 pages, vol. 120, No. 194301, pp. 1-9 (10 pages).

He et al., "A novel ring-shaped vibration damper based on piezoelectric shunt damping: Theoretical analysis and experiments," Journal of Sound and Vibration, 2020, 16 pages, vol. 468, No. 115125, pp. 1-16 (16 pages).

Özdemir et al., "Parity-time symmetry and exceptional points in photonics," Nature Materials, vol. 18, Aug. 2019, pp. 783-798, (16 pages).

Caruso, "A critical analysis of electric shunt circuits employed in piezoelectric passive vibration damping," Smart Materials and Structures, 2001, vol. 10, pp. 1059-1068 (11 pages).

Hagood et al., "Damping of Structural Vibrations With Piezoelectric Materials and Passive Electrical Networks," Journal of Sound and Vibration, vol. 146, No. 2, 1991, pp. 243-268 (26 pages).

El-Ganainy et al., "Non-Hermitian physics and PT symmetry," Nature Physics, vol. 14, Jan. 2018, pp. 11-19 (9 pages).

Lin et al., "Experimental observation of the dual behavior of PT-symmetric scattering," Physical Review A, vol. 85, No. 5, 2012, pp. 1-4 (4 pages).

Ramezani et al., "Bypassing the bandwidth theorem with PT symmetry," Physical Review A, vol. 85, No. 6, 2012, pp. 1-5 (5 pages).

Maksimov et al., "Escape dynamics of a Bose-Hubbard dimer out of a trap," Physical Review A, vol. 89, No. 6, 2014, pp. 1-8 (8 pages).

Bender et al., "Real Spectra in Non-Hermitian Hamiltonians Having PT Symmetry," Physical Review Letters, vol. 80, No. 24, Jun. 15, 1998, pp. 5243-5246 (4 pages).

* cited by examiner

PRESSURE SENSOR FOR AN INFLATABLE STRUCTURE

CROSS-REFERENCE TO RELATED APPLICATIONS

This application claims the benefit of U.S. Provisional Application No. 63/447,489 filed on Feb. 22, 2023, which is incorporated herein by reference in its entirety.

TECHNICAL FIELD

The subject matter described herein relates, in general, to systems for sensing pressure and, more specifically, to systems that use a shunted mechanical resonator to sense the pressure of an inflatable.

BACKGROUND

Systems use sensors to detect precise frequencies for sensing, signal manipulation, and other applications. Pressure sensors are used to measure pressure of liquids and gasses and may also be used indirectly to measure fluid/gas flow, speed, water level, and altitude. Various types of pressure sensors include barometer pressure sensors, vacuum pressure sensors, piezoelectric pressure sensors, and strain gauge pressure sensors. In some instances, these pressure sensors rely on a linear relationship between a directly-measured physical quantity (for example, strain in an outer surface of an inflatable) and the determined pressure. However, in some instances, this linear relationship has limited sensitivity.

SUMMARY

Example systems and methods relate to sensing pressure. A pressure sensor may be provided for measuring the pressure of an inflatable, such as an airbag, an aircraft, an air mattress, sporting equipment (such as a ball, a boat, a paddle board, etc.), a life jacket, a medical device, etc. The pressure sensor may include various components configured to enhance the sensitivity of the pressure sensor. For example, the pressure sensor includes an elastomer, an inductor, a piezoelectric component, and a resonator. Together, these components work to measure the pressure of the inflatable with a higher sensitivity. In one or more arrangements, the elastomer is connected to an outer surface of the inflatable and is strained based on the pressure of the inflatable. The elastomer is connected to the inductor and the piezoelectric component to form a resistor-inductor-capacitor (RLC) circuit. The RLC circuit generates an electrical resonance while the resonator generates a mechanical resonance. The RLC circuit is connected to the resonator, and the electrical resonance couples with the mechanical resonance to result in the observation of an exceptional point that represents an operating point of the pressure sensor that sustains sensitivity through frequency splitting (e.g., spectral distortions). The pressure sensor creates a detuning frequency that is induced by a change in resistance of the elastomer at the vicinity of the exceptional point. The relationship between the detuning frequency and the resistance of the elastomer is a sublinear relation (e.g., a square root) with a small disturbance of the resistance. In this way, the sensitivity of the pressure sensor is improved, resulting in a more accurate pressure measurement than other, commercially available pressure sensors with linear dependence.

In one embodiment, a pressure sensor is disclosed. The pressure sensor includes a circuit including a resistor, an inductor, and a capacitor. The circuit generates an electrical resonance. The resistor is an elastomer having a resistance and connected to an outer surface of an inflatable. The pressure sensor also includes a resonator connected to the circuit. The resonator generates a mechanical resonance coupling with the electrical resonance to create a detuning frequency having a sublinear dependence on the resistance of the elastomer. A pressure of the inflatable correlates with the detuning frequency.

In another embodiment, a pressure sensor is disclosed. The pressure sensor includes a circuit including a resistor, an inductor, and a capacitor connected in series or in parallel. The circuit generates an electrical resonance. The resistor is an elastomer having a resistance and connected to an outer surface of an inflatable. The pressure sensor also includes a resonator connected to the circuit. The resonator generates a mechanical resonance that couples with the electrical resonance to result in frequency splitting at an exceptional point. The frequency splitting results in a detuning frequency having a sublinear dependence on the resistance of the elastomer. A pressure of the inflatable correlates with the detuning frequency.

In yet another embodiment, a pressure sensor is disclosed. The pressure sensor includes a micro-electromechanical systems (MEMS) resonator. The resonator includes a cantilevered beam that vibrates at a resonance frequency when excited to generate a mechanical resonance. The pressure sensor also includes a circuit including a resistor, an inductor, and a capacitor. The resistor is an elastomer having a resistance and connected to an outer surface of an inflatable. The inductor is connected in series or in parallel to the resistor. The capacitor is connected in series or in parallel to the inductor and is a piezoelectric patch. The circuit generates an electrical resonance that couples with the mechanical resonance to create frequency splitting at an exceptional point. The frequency splitting results in a detuning frequency having a sublinear dependence on the resistance of the elastomer. A pressure of the inflatable correlates with the detuning frequency.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Various embodiments are described that are associated with a pressure sensor for measuring the pressure of an inflatable, such as an airbag, an aircraft, an air mattress, a sporting equipment (such as a ball, a boat, a paddle board, etc.), a life jacket, a medical device, etc. The pressure sensor may include various components configured to enhance the sensitivity of the pressure sensor for an improved and more accurate measurement of the pressure of the inflatable. The components include an elastomer, an inductor, a piezoelectric component, and a resonator. Together, the elastomer, the inductor, and the piezoelectric component form a resistor-inductor-capacitor (RLC) circuit, which generates an electrical resonance while the resonator generates a mechanical resonance. The RLC circuit shunts the mechanical resonator, and the electrical resonance couples with the mechanical resonance to result in the observation of an exceptional point that represents an operating point of the pressure sensor that sustains sensitivity through frequency splitting (e.g., spectral distortions). A change in resistance of the elastomer at the vicinity of the exceptional point results in a detuning frequency, and the relationship between the detuning frequency and the resistance of the elastomer is a sublinear relation (e.g., a square root) with a small disturbance of the resistance. In this way, the pressure sensor gives a more accurate pressure measurement than other, commercially available pressure sensors with linear dependence.

Figure 1:
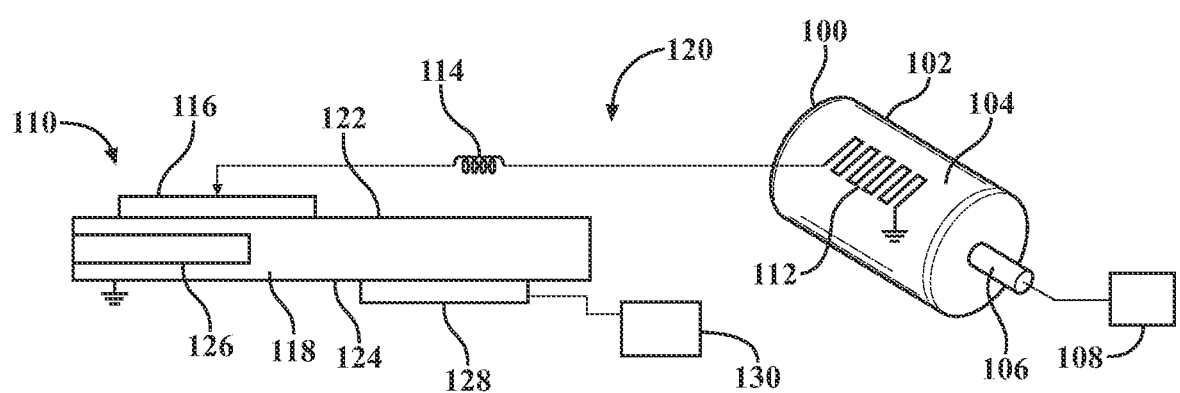
FIG. 1 illustrates an example of a pressure sensor for an inflatable.

Referring to FIG. 1, an example of an inflatable 100 is shown. The inflatable 100 is one of a number of different types of inflatables, for example, an airbag, an aircraft, an air mattress, a sporting equipment (such as a ball, a boat, a paddle board, etc.), a life jacket, a medical device, or another suitable inflatable 100 structure or device. The inflatable 100 includes an inflation chamber 102. The inflation chamber 102 is made from a material suitable for inflation. In one example, the inflation chamber 102 is made from a flexible material such as plastic or fabric. The inflation chamber 102 defines an outer surface 104. The inflation chamber 102 is configured for inflation and deflation. The inflation chamber 102 is inflated with fluid, for example, air, other gas, or even liquid. The inflatable 100 is fluidly connected to an inflation port 106, and the inflation port 106 is fluidly connected, in one arrangement, to an inflation pump 108. The inflation pump 108 is configured to pump fluid into the inflation chamber 102 to inflate the inflation chamber 102 and pump fluid out of the inflation chamber 102 to deflate the inflation chamber 102.

During inflation of the inflation chamber 102 and when the inflation chamber 102 is substantially fully inflated, the pressure within the inflation chamber 102 may be high, thereby stretching the outer surface 104 and causing the outer surface 104 to be stressed (i.e., the outer surface 104 is under tensile load). As used herein, a high pressure of the inflation chamber 102 means that the inflatable 100 is substantially suitable to use for its intended purpose. For example, when the inflatable 100 is a vehicle tire, the inflation chamber 102 may have a high pressure of around 35 pounds per square inch (PSI). During deflation of the inflation chamber 102 and when the inflation chamber 102 is substantially deflated, the pressure within the inflation chamber 102 may be low, thereby relieving stress in the outer surface 104 (i.e., the outer surface is not under tensile load). As used herein, a low pressure of the inflation chamber 102 means that the inflatable 100 is substantially deflated and not suitable to use for its intended purpose For example, when the inflatable 100 is a vehicle tire, the inflation chamber 102 may have a low pressure of around 0 PSI. It should be understood that the pressure of the inflation chamber 102 can be low or high, or the inflation chamber 102 can have a pressure measurement between those values. For example, when the inflatable 100 is a vehicle tire, the inflation chamber 102 may have a medium pressure of around 14 PSI. In such instances, the outer surface 104 may be slightly stretched (e.g., in between relaxed and fully stretched). In one or more arrangements, it may be advantageous to measure the pressure of the inflatable 100. Accordingly, a pressure sensor 110 is described herein for measuring the pressure of the inflatable 100 according to tension on the outer surface 104.

With continued reference to FIG. 1, an example of the pressure sensor 110 is shown. The pressure sensor 110 is provided to determine a pressure measurement of the inflatable 100. More specifically, the pressure sensor 110 is configured to determine a pressure measurement on the outer surface 104. Among other components described in further detail below, the pressure sensor 110 includes an elastomer 112, an inductor 114, a piezoelectric component 116, and a resonator 118. These components work together to measure the pressure of the inflatable 100 with a higher sensitivity compared to other, pressure sensors used in connection with inflatables. Regarding pressure sensors, the sensitivity of the device refers to the ability to measure a change in the pressure in response to various other physical quantities (e.g., resistance, sound velocity, mass density, etc.). Each of these components will be described in further detail below.

As mentioned above, the pressure sensor 110 includes the elastomer 112. The elastomer 112 is connected to the inductor 114 and to the outer surface 104 of the inflatable 100. In one or more arrangements, the elastomer 112 is a material formed from polymer chains held together by relatively weak intermolecular bonds that permit the elastomer 112 to stretch in response to macroscopic stress. The material of the elastomer 112 is a suitable material such as rubber, neoprene, thermoplastic, elastic fiber, etc. The elastomer 112 is connected to the outer surface 104. In one example, the elastomer 112 is integrated into the material of the outer surface 104. In another example, the elastomer 112 is bonded or otherwise adhered to the outer surface 104.

Figure 2A:
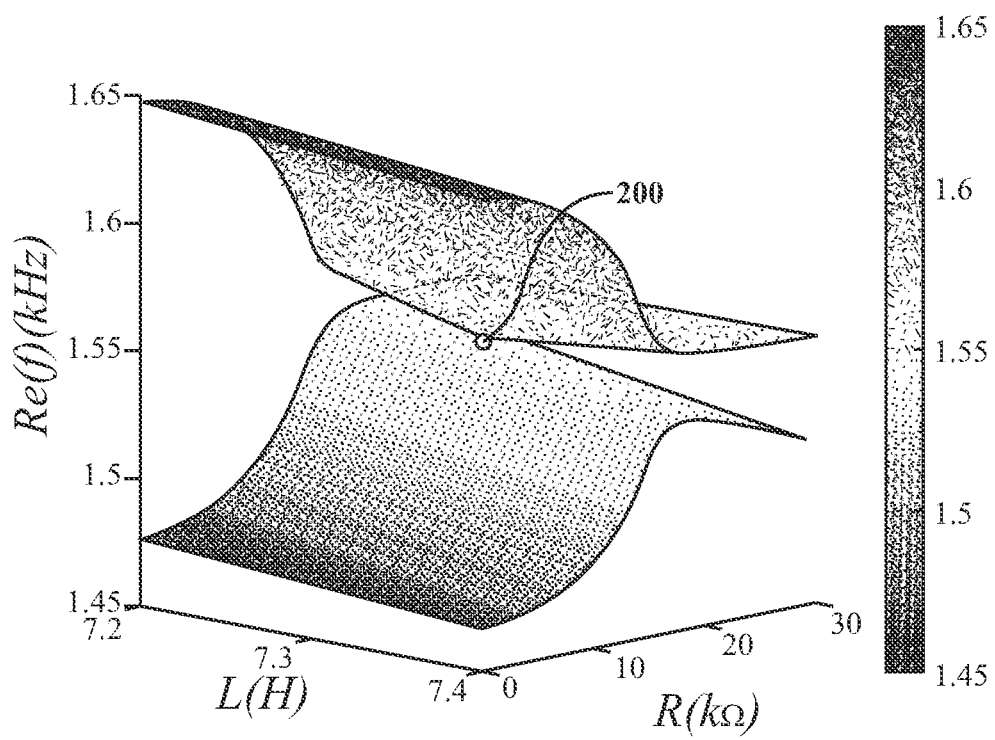
FIG. 2A illustrates a three-dimensional graph of the real frequencies of the pressure sensor, showing an exceptional point of the pressure sensor at the coalescence of real frequencies.
Figure 2B:
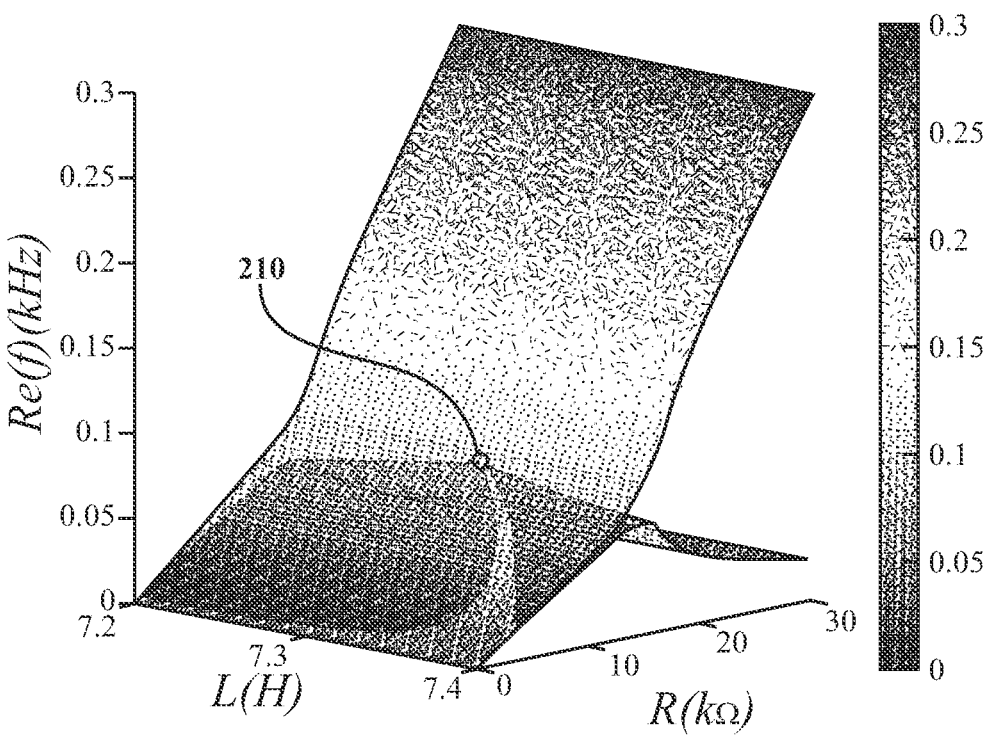
FIG. 2B illustrates a three-dimensional graph of the imaginary frequencies of the pressure sensor, showing an exceptional point of the pressure sensor at the coalescence of imaginary frequencies.

As mentioned above, as the inflatable 100 inflates and deflates, the outer surface 104 respectively stretches and relaxes (e.g., the tension of the outer surface 104 changes). Accordingly, the elastomer 112 deforms with the outer surface 104. More specifically, the elastomer 112 stretches when the outer surface 104 stretches as the inflatable 100 inflates, which causes a higher strain force within the elastomer 112. Similarly, the elastomer 112 relaxes when the outer surface 104 relaxes as the inflatable 100 deflates, which causes a lower strain force within the elastomer 112 or no strain force within the elastomer 112. Accordingly, when the inflatable 100 is substantially fully inflated, the outer surface 104 exhibits higher tension and the elastomer 112 exhibits higher strain. Similarly, when the inflatable 100 is substantially fully deflated, the outer surface 104 exhibits lower tension and the elastomer 112 exhibits lower or substantially no strain. In one or more arrangements, the elastomer 112 functions as a resistor having a resistance R. In some instances, for example, as shown in FIGS. 2A and 2B, the resistance R is between about 0 kiloohms (kΩ) and 30 kΩ. The change in strain of the elastomer 112 corresponds to a change in resistance R of the elastomer 112. More specifically, a higher strain in the elastomer 112 corresponds to a higher resistance R of the elastomer 112, and a lower or substantially no strain in the elastomer 112 corresponds to a lower resistance R of the elastomer 112. As described in further detail below, the pressure sensor 110 is configured to measure the pressure of the inflatable 100 by measuring the resistance R of the elastomer 112.

As mentioned above, the pressure sensor 110 also includes the inductor 114. The inductor is connected to the elastomer 112 and the piezoelectric component 116 and has an inductance L. In some instances, for example, as shown in FIGS. 2A and 2B, the inductance L is between about 7.2 henrys (H) and 7.4 H. In one or more arrangements, the inductor 114 is an electrical component that stores energy in a magnetic field when electric current flows through it. In one example, the inductor 114 is formed from an insulated wire wound into a coil. As described in further detail below, the inductor 114 transfers electrical energy from the elastomer 112 to the piezoelectric component 116 to facilitate measurement of the pressure of the inflatable 100 by the pressure sensor 110.

As mentioned above, the pressure sensor 110 also includes the piezoelectric component 116. The piezoelectric component 116 is connected to the inductor 114 and to the resonator 118. In one example, the piezoelectric component 116 is a piezoelectric patch formed from a piezoelectric crystal placed between two metal plates. In one or more arrangements, the piezoelectric component 116 is bonded to a surface of the resonator 118. For example, as shown, the piezoelectric component 116 is bonded to a top surface 122 of the resonator 118, however, the piezoelectric component 116 can be bonded to another suitable surface of the resonator 118, such as a bottom surface 124 of the resonator 118. As described in further detail below, in one or more arrangements, the piezoelectric component 116 functions as a capacitor having a capacitance C and is configured to store electrical energy or transfer electrical energy through the inductor 114 to the elastomer 112 to facilitate measurement of the pressure of the inflatable 100 by the pressure sensor 110.

Together, the elastomer 112, the inductor 114, and the piezoelectric component 116 form a resistor-inductor-capacitor (RLC) circuit 120. In one or more arrangements, the elastomer 112, the inductor 114, and the piezoelectric component 116 are connected in series, and in other arrangements, the elastomer 112, the inductor 114, and the piezoelectric component 116 are connected in parallel. As mentioned above, the piezoelectric component 116 is connected to the resonator 118. As described in further detail below, the resonator 118 is configured to vibrate, and in one or more arrangements, the piezoelectric component 116 directly exploits the vibration of the resonator 118 to turn the mechanical energy in to electric energy. Energy is stored in an electric field as the piezoelectric component 116 is charged and in a magnetic field as current flows through the inductor 114. These two energy stores can transfer from the piezoelectric component 116 to the inductor 114 in an oscillatory manner. Accordingly, the RLC circuit 120 forms a harmonic oscillator for current passing through the RLC circuit 120 and therefore generates an electrical resonance. The electrical resonance has an electrical resonance frequency $f_E$. Accordingly, the RLC circuit 120 "shunts" the resonator 118, as described in further detail below. As shown in FIG. 1, the RLC circuit 120 is grounded at the elastomer 112 and at the resonator 118. However, in other arrangements, the RLC circuit 120 is grounded at other suitable points, for example, at the interface of the piezoelectric component 116 and the resonator 118.

As mentioned above, the resonator 118 is configured to vibrate. Accordingly, in one or more arrangements, the resonator 118 is a MEMS (micro-electromechanical systems) device having components configured to vibrate and generate a mechanical resonance. In one example, the resonator 118 includes a cantilevered beam 126. As shown in FIG. 1, the cantilevered beam 126 is a beam that is fixed at one of its ends and free to move at its other end. When the resonator 118 is exposed to external excitations, the free end of the cantilevered beam 126 vibrates at its natural resonance frequency, thus generating the mechanical resonance. The mechanical resonance has a mechanical resonance frequency $f_M$. To excite the resonator 118, in one or more arrangements, the resonator 118 includes a excitation source 128. The excitation source 128 is connected external to the resonator 118 in a suitable location. For example, the excitation source 128 is connected to the bottom surface 124 of the resonator 118. However, the excitation source 128 can be connected to the resonator 118 in another suitable location. In one or more arrangements, the excitation source 128 is a piezoelectric actuator configured to convert electric power into mechanical vibrations to vibrate (e.g., shake) the resonator 118. Accordingly, the excitation source 128 is connected to a power source 130. The power source 130 can be a suitable power source, such as a battery, an AC power plug, a generator, etc.

As mentioned above, when the RLC circuit 120 is connected to the resonator 118, the resonator 118 is "shunted" by the RLC circuit 120 (e.g., the RLC circuit is a "shunting circuit"). In other words, the electrical resonance of the RLC circuit 120 couples with the mechanical resonance of the resonator 118 (e.g., the RLC circuit 120 and the resonator 118 create resonance coupling). In one or more arrangements, coupling of the electrical resonance and the mechanical resonance results when the electrical resonance and the mechanical resonance have the same resonance mode (e.g., when the crests of the electrical resonance substantially align with the crests of the mechanical resonance). In one or more other arrangements, coupling of the electrical resonance and the mechanical resonance results when the electrical resonance and the mechanical resonance are out of phase (e.g., when the crests of the electrical resonance substantially align with the troughs of the mechanical resonance or when the crests of the mechanical resonance substantially align with the troughs of the electrical resonance).

As mentioned above, the electrical resonance has an electrical resonance frequency of $f_E$, and the mechanical resonance has a mechanical resonance frequency of $f_M$. The resonance frequencies may also be referred to as eigenfrequencies. An eigenfrequency may be a frequency where the components of a system (e.g., the RLC circuit 120 and the resonator 118) naturally oscillate in the absence of driving forces. Natural oscillation and coupling of the electrical resonance and the mechanical resonance results in frequency splitting (e.g., spectral distortions). An exceptional point is observed through frequency splitting. The exceptional point may represent an operating point of the pressure sensor 110 that sustains sensitivity through frequency splitting (e.g., spectral distortions). Referring to FIGS. 2A and 2B, the real and imaginary eigenfrequencies of the pressure sensor 110 are respectively shown as a function of the inductance L and the resistance R. The point 200 denotes the exceptional point for the simultaneous coalescence of the real eigenfrequencies (FIG. 2A), and the point 210 denotes the exceptional point for the simultaneous coalescence of the imaginary eigenfrequencies (FIG. 2B). In other words, the pressure sensor 110 creates a detuning frequency δf that is induced by a change in resistance δR of the elastomer 112 at the vicinity of the exceptional point ($R_{EP}$). The relationship between the detuning frequency δf and the resistance R of the elastomer 112 is sublinear (e.g., a square root) relation with a small disturbance of the resistance R. The dependence is shown by the following relationship:

$$\delta f \propto (R - R_{EP})^{1/2}$$

Accordingly, in one or more arrangements, the pressure of the inflatable 100 is determined by measuring the detuning frequency δf. Therefore, the sensitivity of the pressure sensor 110 is improved, resulting in a more accurate pressure measurement than other, commercially available pressure sensors with linear dependence. The exceptional point 200, 210 is found by tuning the parameters of the system. For example, the exceptional point is found by tuning the inductance L of the inductor 114, the capacitance C of the piezoelectric component 116, and the mechanical resonance $f_M$ of the resonator 118. Moreover, in one or more arrangements, the exceptional point is observed when the electrical resonance frequency $f_E$ is greater than the mechanical resonance frequency $f_M$. However, in other arrangements, the electrical resonance frequency $f_E$ does not need to be greater than the mechanical resonance frequency $f_M$ in order to observe the exceptional point.

Figure 3:
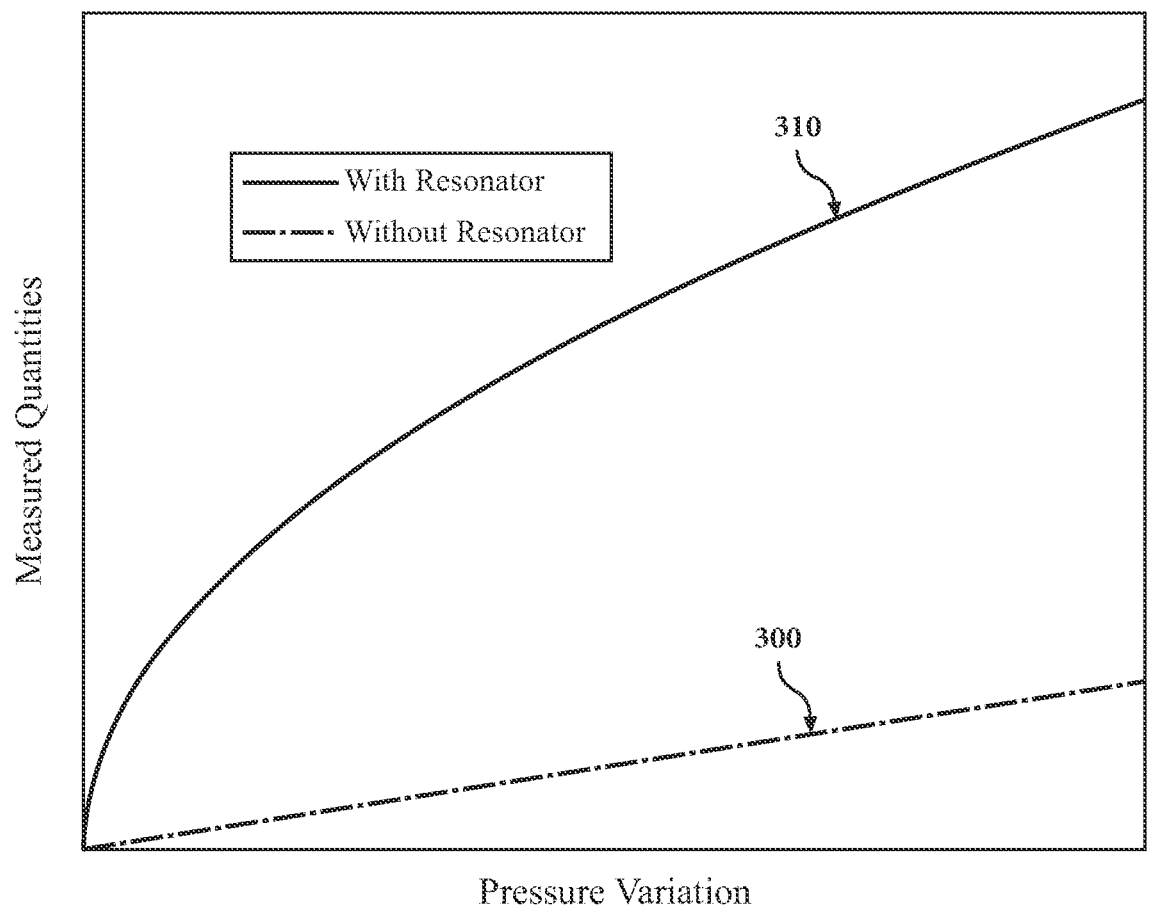
FIG. 3 illustrates the relationship between the measured quantities of the inflatable and the pressure of the inflatable with the pressure sensor and without the pressure sensor.

Referring now to FIG. 3, the measured quantities of the inflatable 100 are shown as a function of the pressure variation of the inflatable 100. More specifically, curve 300 depicts the measured resistance R variation of the elastomer 112 of the inflatable 100 as a function of the pressure variation without use of the resonator 118. It can be seen that the measured resistance R has a linear dependence on the pressure variation. On the other hand, curve 310 depicts the measured frequency detuning of the pressure sensor 110 as a function of the pressure variation of the inflatable 100 with the use of the resonator 118. It can be seen that the sensitivity of the pressure measurement is greatly enhanced because of the sublinear relationship.

The arrangements described herein have the benefit of improving the sensitivity of a pressure sensor for measuring the pressure of an inflatable. Through shunting of a mechanical resonator, greater accuracy of a pressure sensor is observed through a sublinear relationship between the detuning frequency and directly measured physical quantities of the inflatable.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A pressure sensor, comprising:
a circuit including a resistor, an inductor, and a capacitor, wherein the circuit generates an electrical resonance, and wherein the resistor is an elastomer having a resistance and connected to an outer surface of an inflatable; and
a resonator connected to the circuit that generates a mechanical resonance coupling with the electrical resonance to create a detuning frequency having a sublinear dependence on the resistance of the elastomer, and wherein the detuning frequency correlates with a pressure measurement of the inflatable.

2. The pressure sensor of claim 1, wherein coupling of the mechanical resonance with the electrical resonance results in frequency splitting at an exceptional point, and wherein the frequency splitting results in the detuning frequency.

3. The pressure sensor of claim 2, wherein the electrical resonance and the mechanical resonance have real and imaginary eigenfrequencies and are coupled together, and wherein the exceptional point occurs at the coalescence of the real and imaginary eigenfrequencies.

4. The pressure sensor of claim 2, wherein the exceptional point is a function the resistance and the mechanical resonance.

5. The pressure sensor of claim 2, wherein the exceptional point occurs when the electrical resonance is greater than the mechanical resonance.

6. The pressure sensor of claim 1, wherein the outer surface changes tension according to the pressure of the inflatable, thereby causing a change in resistance of the elastomer, wherein the change in resistance correlates with the detuning frequency, and wherein the detuning frequency correlates with a pressure measurement of the inflatable.

7. The pressure sensor of claim 1, wherein, when the outer surface has a high tension, the elastomer has a high resistance, and the inflatable has a high pressure measurement, and wherein, when the outer surface has a low tension, the elastomer has a low resistance, and the inflatable has a low pressure measurement.

8. The pressure sensor of claim 1, wherein the sublinear dependence is a square-root dependence.

9. The pressure sensor of claim 1, wherein the resonator is a micro-electromechanical systems (MEMS) component including a cantilevered beam that vibrates at a resonance frequency when excited, and further comprising a excitation source connected to the resonator and configured to vibrate the cantilevered beam to generate the mechanical resonance.

10. The pressure sensor of claim 1, wherein the capacitor is a piezoelectric patch bonded to a surface of the resonator.

11. The pressure sensor of claim 1, wherein the inductor, the resistor, and the capacitor are connected in series.

12. A pressure sensor, comprising:
a shunting circuit including a resistor, an inductor, and a capacitor connected in series, wherein the circuit generates an electrical resonance, and wherein the resistor is an elastomer having a resistance and connected to an outer surface of an inflatable; and
a resonator connected to and shunted by the shunting circuit, wherein the resonator generates a mechanical resonance that interacts with the electrical resonance to result in frequency splitting at an exceptional point, wherein the frequency splitting results in a detuning frequency having a sublinear dependence on the resistance of the elastomer, and wherein the detuning frequency correlates with a pressure of the inflatable.

13. The pressure sensor of claim 12, wherein the electrical resonance and the mechanical resonance have real and imaginary eigenfrequencies, and wherein the exceptional point occurs at the coalescence of the real and imaginary eigenfrequencies.

14. The pressure sensor of claim 12, wherein the sublinear dependence is a square-root dependence.

15. The pressure sensor of claim 12, wherein the resonator is a micro-electromechanical systems (MEMS) component including a cantilevered beam that vibrates at a resonance frequency when excited, and further comprising a excitation source connected to the resonator and configured to vibrate the cantilevered beam to generate the mechanical resonance.

16. The pressure sensor of claim 12, wherein the capacitor is a piezoelectric patch bonded to a surface of the resonator.

17. A pressure sensor, comprising:
a micro-electromechanical systems (MEMS) resonator including a cantilevered beam that vibrates at a resonance frequency when excited to generate a mechanical resonance;
a circuit comprising:
a resistor, wherein the resistor is an elastomer having a resistance and connected to an outer surface of an inflatable;
an inductor connected in series to the resistor; and
a capacitor connected in series to the inductor, wherein the capacitor is a piezoelectric patch, wherein the circuit generates an electrical resonance that couples with the mechanical resonance to create frequency splitting at an exceptional point, wherein the frequency splitting results in a detuning frequency having a sublinear dependence on the resistance of the elastomer, and wherein a pressure of the inflatable correlates with the detuning frequency.

18. The pressure sensor of claim 17, wherein the electrical resonance and the mechanical resonance have real and imaginary eigenfrequencies, and wherein the exceptional point occurs at the coalescence of the real and imaginary eigenfrequencies.

19. The pressure sensor of claim 17, wherein the sublinear dependence is a square-root dependence.

20. The pressure sensor of claim 17, further comprising a excitation source connected to the resonator and configured to vibrate the cantilevered beam to generate the mechanical resonance.

* * * * *